United States Patent
Burdock et al.

(10) Patent No.: US 6,688,612 B1
(45) Date of Patent: Feb. 10, 2004

(54) VEHICLE SUSPENSIONS

(75) Inventors: William Burdock, West Midlands (GB); Stephen Williams, Birmingham (GB)

(73) Assignee: Land Rover Group Limited, St. Helier (GB)

(*) Notice: Subject to any disclaimer, the term of this patent is extended or adjusted under 35 U.S.C. 154(b) by 49 days.

(21) Appl. No.: 09/715,284

(22) Filed: Nov. 17, 2000

(30) Foreign Application Priority Data

Nov. 19, 1999 (GB) .............................. 9927295

(51) Int. Cl.$^7$ .............................. B06G 17/00
(52) U.S. Cl. ................ 280/5.502; 280/5.507; 280/5.516; 280/5.508
(58) Field of Search .............. 280/5.5, 5.502, 280/5.507, 5.508, 5.509, 5.514, 5.515, 5.519, 6.15, 6.153, 6.154, 6.155, 6.156

(56) References Cited

U.S. PATENT DOCUMENTS 3,857,577 A * 12/1974 Kuntz
4,796,911 A    1/1989 Kuroki et al.
5,765,115 A    6/1998 Ivan
6,007,073 A * 12/1999 Gunter .................... 280/6.153
6,338,014 B2 * 1/2002 Heyring et al. ............. 280/5.5

FOREIGN PATENT DOCUMENTS

EP    0119564 A2    3/1984

* cited by examiner

Primary Examiner—Eric Culbreth
(74) Attorney, Agent, or Firm—Davis & Bujold, PLLC

(57) ABSTRACT

A vehicle air suspension system includes a control unit 32 which is arranged to produce a running measure of the level of cross articulation of the two axles 18, 20 and, if it exceeds a certain level indicating that the vehicle is on rough terrain, to open respective interconnections 34, 36 between the suspension units 24 on opposite ends of each axle so as to reduce the resistance to that articulation. The interconnections are arranged to close when the vehicle speed increases so as to provide roll control.

25 Claims, 2 Drawing Sheets

VEHICLE SUSPENSIONS

FIELD OF THE INVENTION

The present invention relates to active and semi-active vehicle suspensions and in particular to such suspensions for off-road vehicles.

BACKGROUND TO THE INVENTION

Vehicle suspensions are characterized in various ways, including the stiffness in roll, single axle articulation, and cross articulation. There are two aspects of a suspension which determine how easily the wheels can move in articulation. One is the damping rate of the dampers, and the other is the spring rate of the springs in the suspension. The term stiffness refers to the spring rate. Therefore the articulation stiffness of the front axle of a vehicle is expressed as a force (expressed as a moment or a linear force) per unit of articulation displacement of the front wheels (expressed as an angular articulation displacement or a linear difference in ride height). The cross articulation stiffness is defined as a force per unit of cross articulation displacement, expressed, for example, as a linear difference in average ride height between two pairs of diagonally opposite wheels.

When a vehicle is travelling over rough terrain it is desirable to allow a high degree of articulation of the wheels, that is vertical movement of the wheels on opposite sides of the vehicle in opposite directions. In particular a high degree of cross articulation is desirable, that is articulation of the front wheels in one direction and articulation of the rear wheels in the opposite direction. This enables the vehicle to maintain traction over highly uneven ground. However this can conflict with the need for firm roll control when the vehicle is travelling at higher speeds on a road, since roll can be considered as articulation of the front and rear axles in the same direction.

This conflict arises, for example, in interconnected fluid suspensions, such as interconnected air suspensions, where the level of interconnection between air strings on opposite sides of the vehicle can be selected to control the level of resistance to articulation.

For example, it is also known from U.S. Pat. No. 5,765,115 to provide an air suspension system in which the air springs of the two rear wheels are interconnected by a pipe, which can be closed and opened by a gate valve, and the air springs of the two front wheels are similarly interconnected. Closing the valves increases roll stiffness of the vehicle, and opening them increases the ease of articulation.

The same conflict arises with the use of anti-roll bars which need to be stiff to provide good roll control on road, but much less stiff to allow sufficient articulation off-road.

This problem has been addressed, for example, by the type of system disclosed in U.S. Pat. No. 4,796,911 which discloses a vehicle with a split anti-roll bar, with a hydraulic de-coupling device between the two halves. A rough road sensor detects when the vehicle is travelling over a rough road and, in response, the two halves of the anti-roll bar are de-coupled from each other so as to increase the ease of articulation. On smooth roads the two halves are coupled together again so as to increase roll stiffness.

A similar conflict arises with dampers which are usually required to provide a relatively high level of damping for on-road use, but a reduced level of damping to increase ease of articulation during off road use. It is well known to address this problem using switchable dampers which have a damping rate which can be varied to suit the current driving conditions.

Whilst these systems do address the problem, there is always a need for better control of such systems.

SUMMARY OF THE INVENTION

The present invention provides a vehicle suspension system for connecting at least one pair of wheels to opposite sides of a vehicle body, the system comprising a suspension associated with said at least one pair of wheels and arranged to allow articulation movement of said at least one pair of wheels relative to the body and to provide adjustable resistance to said articulation movement, sensors arranged to measure movement of the suspension, and a controller arranged to monitor said movement and to determine therefrom the level of said articulation movement and to reduce said resistance if said articulation movement reaches a predetermined level.

Preferably the adjustable resistance to articulation movement is an adjustable articulation stiffness. However, it could also be an adjustable damping rate provided by dampers which either damp all vertical movements of the individual wheels, or damp specifically articulation movements.

The measured articulation can be single axle articulation, that is the difference in ride height between the two front wheels, or the difference in ride height between the rear two wheels of a typical four-wheeled vehicle. Alternatively the measured articulation may be cross articulation, that is the difference between the articulation of the front wheels, and the articulation of the rear wheels.

Preferably the sensors are arranged to measure the ride height of each of said at least one pair of wheels and the controller is arranged to determine the level of articulation movement of said at least one pair of wheels from the measured ride heights.

Preferably the controller is arranged to determine a level of cross articulation movement between two pairs of the wheels, each pair being on opposite sides of the body, and to reduce said resistance if said cross articulation movement reaches a predetermined level.

The sensors may be arranged to measure the ride heights of each of both pairs of wheels, and the controller arranged to determine the level of cross articulation movement from the measured ride heights.

Preferably the controller is arranged to calculate a running measure of the level of articulation movement and to reduce said resistance if the running measure reaches a predetermined level.

Preferably the running measure is arranged to increase during periods when said level of articulation movement is high and to decrease during periods when said level of articulation movement is low.

Preferably the system further comprises a vehicle speed sensor arranged to measure a travelling speed of the vehicle, and the running measure includes a speed dependent offset arranged to cause it to reduce when the travelling speed of the vehicle is high.

Preferably the controller is arranged to increase the level of said resistance when the running measure falls below a predetermined level.

Preferably the controller is arranged to measure an instantaneous articulation displacement of the wheels, and running measure is a running average of the articulation displacement.

Preferably the controller includes a low pass filter and is arranged, when determining the level of said articulation movements, to filter out articulation movements of a frequency higher than a predetermined limit frequency.

Preferably the body has a natural frequency of vibration on the suspension and said limit frequency is of the order of said natural frequency of vibration, which is desirably of the order of 2 to 3 Hz.

Preferably the articulation sensors are arranged to measure the instantaneous articulation displacement of the wheels and to reduce said resistance only when said displacement is less than a predetermined limit.

Preferably the controller is arranged to detect when the vehicle is travelling on a side slope, and, in response to detection of a side slope, to increase said resistance.

The present invention further provides a vehicle suspension system for connecting at least one pair of wheels to opposite sides of a vehicle body, the system comprising a suspension associated with said at least one pair of wheels and arranged to allow articulation movement of said at least one pair of wheels relative to the body and to provide adjustable resistance to said articulation, a side slope detector arranged to detect when the vehicle is travelling on a side slope, and a controller operably connected to the suspension and the side slope detector and arranged to increase said resistance in response to detection of a side slope.

Where said resistance is adjustable between a high level and a low level, the controller is preferably arranged to detect when the vehicle is travelling on a side slope, and, if a side slope is detected when the resistance is at the low level, to adjust it to the high level.

Preferably the system further comprises a plurality of sensors arranged to send signals to the controller and the controller is arranged to use the signals to detect when the vehicle is travelling on a side slope.

The present invention further provides a vehicle suspension system for connecting at least one pair of wheels to opposite sides of a vehicle body, the system comprising a suspension associated with said at least one pair of wheels and arranged to allow articulation movement of said at least one pair of wheels relative to the body and to provide adjustable resistance to said articulation, a plurality of sensors, and a controller operably connected to the suspension and the sensors wherein the controller is arranged to receive signals from the sensors, to determine from said signals when the vehicle is travelling on a side slope, and to increase said resistance in response to detection of a side slopes.

Preferably said resistance is adjustable between a high level and a low level and the controller can be shut down and started up and is arranged: to measure an instantaneous articulation displacement of the wheels, on shut down to store the instantaneous articulation displacement of the wheels and the instantaneous level of said resistance, and on start up, if the instantaneous level of said resistance on shut down was the low level, to compare the instantaneous displacement with the stored displacement and, if they are substantially the same, to return the resistance to the low level.

The present invention further provides a vehicle suspension system for connecting at least one pair of wheels to opposite sides of a vehicle body, the system comprising a suspension associated with said at least one pair of wheels and arranged to allow articulation movement of said at least one pair of wheels relative to the body and to provide resistance to said articulation movement which resistance is adjustable between a high level and a low level, and a controller for adjusting said resistance wherein the controller can be shut down and started up and is arranged: to measure an instantaneous displacement of the wheels, on shut down to store the instantaneous displacement of the wheels and the instantaneous level of said resistance, and on start up, if the instantaneous level of said resistance on shut down was the low level, to compare the instantaneous displacement with the stored displacement and, if they are substantially the same, to return the resistance to the low level.

Preferably the controller is arranged, if said instantaneous displacement and said stored displacement are not substantially the same, to measure an instantaneous articulation displacement of the wheels and, if it is below a predetermined threshold to return the resistance to the low level.

Preferably the controller is arranged, if said instantaneous articulation is above said predetermined threshold, to delay returning of said resistance to said low level until the instantaneous articulation next falls to said predetermined threshold.

The suspension may include fluid filled suspension units associated with the wheels, with an adjustable fluid interconnection provided between the units, the controller being arranged to reduce said resistance by adjusting the interconnection. The fluid may be air or hydraulic fluid.

Alternatively the suspension may include a split anti-roll bar having two halves which can be de-coupled from each other to reduce said resistance.

The present invention further provides a vehicle suspension system for connecting a pair of wheels to opposite sides of a vehicle body, the system comprising a suspension associated with said wheels and arranged to allow articulation movement of wheels relative to the body and to provide adjustable resistance to said articulation movement, ride height sensors arranged to measure the ride height or each of the wheels, and a controller arranged to monitor the measured ride heights and to determine therefrom a level of said articulation movement and to reduce said resistance if said articulation movement reaches a predetermined level.

The present invention still further provides a vehicle suspension system for connecting two pairs of wheels to opposite sides of a vehicle body, the system comprising a suspension associated with said wheels and arranged to allow articulation movement of each of said pairs of wheels relative to the body and to provide adjustable resistance to said articulation movement, ride height sensors arranged to measure the ride height of each of the wheels, and a controller arranged to monitor the measured ride heights and to determine therefrom a level of cross articulation movement of the wheels, and to reduce said resistance if said level of cross articulation movement reaches a predetermined level.

Preferred embodiments of the present invention will now be described by way of example only with reference to the accompanying drawings.

DETAILED DESCRIPTION OF THE PREFERRED EMBODIMENTS

Figure 1:
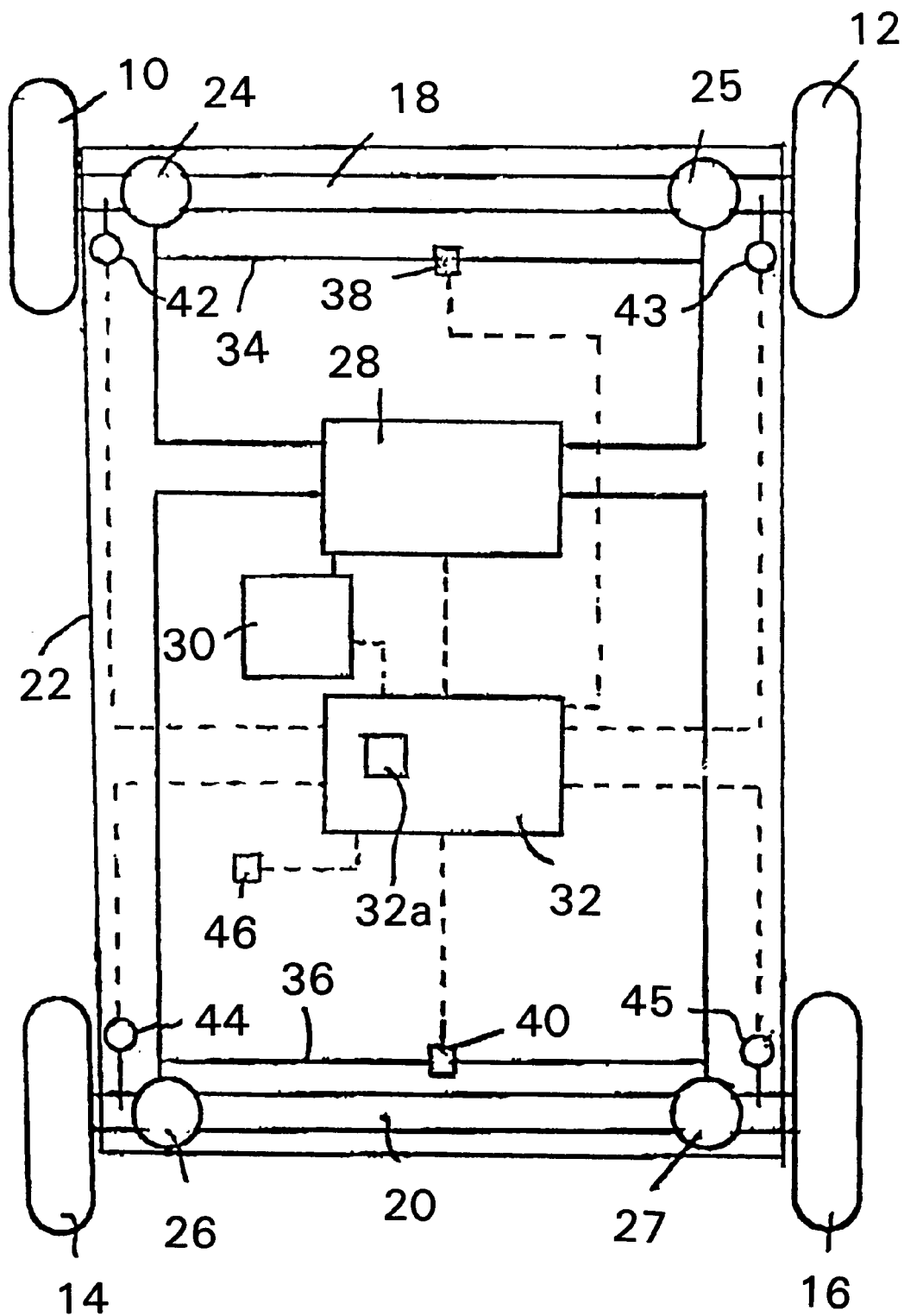
FIG. 1 is a diagrammatic representation of a vehicle including a suspension system according to a first embodiment of the invention.

A vehicle has two front wheels 10, 12 and two rear wheels 14, 16, the front pair being mounted on a front beam axle 18 and the rear pair being mounted on a rear beam axle 20. The axles 18, 20 are connected to the vehicle body 22 by an air suspension system which includes four air springs 24, 25, 26, 27, one at each end of each axle 18, 20. Each air spring therefore controls the ride height at a respective one of the wheels 10, 12, 14, 16, that is the height of the body relative to wheels. The air springs are each pneumatically connected to a valve block 28 which controls the flow of air from a compressor 30 to the springs, and from the springs to atmosphere. The valve block 28 and compressor 30 are controlled by a control unit 32. A pneumatic interconnection 34 is also provided between the front two air springs 24, 25, and another 36 between the rear two 26, 27. Each interconnection 34, 36 can be opened and closed by a respective cross-link valve 38, 40.

The control unit 32 is connected to ride height sensors 42, 43, 44, 45 each associated with a respective one of the wheels 10, 12, 14, 16 and with a vehicle speed sensor 46 which could comprise one or more wheel speed sensors from an anti-lock braking system. The ride height sensors 42, 43, 44, 45 measure the ride height of the wheels by measuring the relative position of a part of the suspension system, such as the ends of the axles 18,20, and the body 22.

Under normal on-road driving conditions the cross-link valves 38, 40 are kept closed and the control unit 32 controls the flow of air into and out of the air springs 24, 25, 26, 27 on the two sides of the vehicle so as to control vehicle roll. However, if it detects, as described below, that the vehicle is travelling over rough terrain where low resistance to articulation will be required to maintain traction and optimize the load distribution between the wheels 10, 12, 14, 16, it opens the cross link valves, This decreases the articulation stiffnesses of the front and rear axles, and therefore decreases the cross articulation stiffness of the suspension.

Rough terrain generally produces high levels of cross articulation movement of the wheels at relatively low frequencies. Therefore the system needs to monitor for these high levels of movement either in cross articulation, or in single axle articulation.

A first method of monitoring for and detecting conditions when the cross-linking valves 38, 40 should be opened will now be described. This method relies on the fact that, for a moving vehicle, if the average articulation displacement is high, then this implies that a high level of articulation movement is occurring. This is particularly true of cross articulation since the cross articulation displacement cannot stay constant in a moving vehicle. It is also generally true of single axle articulation because high levels of roll are unlikely to be sustained for long periods except when cornering at high speeds, or when the vehicle is on a side slope. Methods of dealing with these circumstances will be described below.

Firstly the control unit uses the signals from the ride height sensors 42, 43, 44, 45 to calculate a the instantaneous level of articulation of the front wheels, and that of the rear wheels. To measure the instantaneous articulation displacement $A_f$ of the front wheels the control unit subtracts the ride height at the front left wheel $H_{fl}$ from that at the front right wheel $H_{fr}$, using the equation:

$$A_f = R_{fr} - H_{fl}$$

Similarly the instantaneous articulation displacement of the rear wheels is calculated by subtracting the ride height at the rear left wheel $H_{rl}$ from that at the rear right wheel $H_{rr}$, using the equation:

$$A_r = H_{rr} - H_{rl}$$

Each articulation measure $A_f$ and $A_r$ therefore has a magnitude, which will be zero when the two wheels are at the same ride height, and a sign which can be positive or negative depending on whether the articulation is to the left or to the right. Therefore at any instant the instantaneous level of cross articulation displacement $A_{cross}$ can be determined by subtracting the rear articulation displacement $A_r$ from the front articulation displacement $A_f$, using the equation:

$$A_{cross} = A_f - A_r$$

Because this value can be positive or negative, and will be zero when the ride heights of all the wheels are equal or the vehicle is experiencing pure roll or pure pitch movement, the modulus of it is then taken and filtered using a low pass filter. This cuts out the parts of the signal which are due to high frequency articulation movements, or vibrations, from small scale unevenness in the road surface and produces a signal $A_{cross,LPF}$ indicative of the cross articulation produded by larger scale unevenness in the surface being driven on. The frequencies of interest are those of the order of the natural frequency of the vehicle body or lower. That natural frequency can the natural frequency of vibration of the body in bounce or pitch or roll movement relative to the wheels, since these frequencies are all generally similar. The low pass filter therefore cuts out frequencies above a limit which will generally be in the range from 2 to 3 Hz. The level of cross articulation movement is then measured by producing a running measure, or running average of the articulation displacement in the form of an integral $Z_{cross}$ of $(A_{cross,LPF} - X)k$, i.e.

$$\text{Cross\_Articulation\_level } Z_{cross} = \int_0^\infty (A_{cross,LPF} - X) * k$$

where X is a speed dependent offset which increases with vehicle speed and k is a scaling factor. It will be appreciated that at higher speeds with low levels of cross articulation the integral $Z_{cross}$ will fall in value with time, but at lower speeds with higher levels of articulation $Z_{cross}$ will rise with time. When this integral $Z_{cross}$ is higher than a predetermined threshold value $Z_{cross,\ limit}$, this indicates that the vehicle is travelling on a rough road surface, The control unit therefore checks whether the modulus of the cross articulation displacement $A_{cross}$, is smaller than a predetermined value $A_{cross,\ limit}$. If it is, or otherwise if it falls to that value while the integral $Z_{cross}$ is still high indicating a rough road, then the cross linking valves are opened to allow the wheels to articulate more easily. When this integral $Z_{cross}$ falls to below the threshold value $Z_{cross,\ limit}$, this indicates that the vehicle is no longer travelling on a rough road surface. The control unit checks whether the modulus of the cross articulation displacement $A_{cross}$, is smaller than the predetermined threshold value $A_{cross,\ limit}$. If it is, or otherwise if it falls to that threshold value while the integral $Z_{cross}$ is still low indicating a smooth road, then the cross linking valves are closed again to make the suspension stiffer in roll. The valves are only opened and closed at low levels of cross articulation displacement to ensure a smooth transition from the closed to the open states, and back. If this were not done on the transition from the closed state to the open state then sudden changes of attitude and ride height of the vehicle could occur as the air is suddenly able to flow between the air springs. If it were not done on the transition from the open state to the closed state, then the distribution of air between the two sides of the vehicle could be temporarily held in an uneven state. The value of $A_{cross,\ limit}$ can be chosen to suit the particular vehicle and the level of refinement required, but in this particular embodiment is 20 mm.

It will be appreciated that the system can be tuned by varying the rate at which the offset X varies with speed and by varying the size of the scaling factor k. For example, the offset X will generally be low at low speeds so that the integral $Z_{cross}$ can build up quickly resulting in early detection of articulation. It can then be made to increase very rapidly at higher speeds so that the cross linking valves will always be closed above a certain speed. The speed selected will depend on the particular vehicle and the handling characteristics required, but could be 40 kph for example. With a small offset the decay of the integral $Z_{cross}$ will be slow, which can be helpful to prevent switching of the valves to the closed position when the vehicle is only on a short stretch of smooth road.

When the vehicle is stopped and the system shut down, the status of the cross link valves 38, 40 is checked and stored in non-volatile memory 32a in the control unit. The ride heights of each of the wheels is also stored, as is the current value of the cross articulation displacement integral $Z_{cross}$. Then when the system is started up again, if the valves had been open on shut down, then it is assumed that the vehicle is still on rough ground, and that they therefore need to be opened again on start up. In this way the system can carry on essentially as if it had not been shut down. However, before they are opened, the current ride heights are compated with those stored in memory. If they are the same, then the cross link valves 38, 40 are opened immediately. However, if the ride heights have changed, then the pressure of air in the air springs may have changed, and opening the valves immediately could cause some undesirable suspension travel as the pressures in the air springs equalised. Therefore the instantaneous level of cross articulation displacement is checked, and the valves 38, 40 only opened if it is below the threshold value $A_{cross,\ limit}$. If it is above that threshold value, then opening of the valves is delayed until it next falls to that threshold value, at which point the valves are opened.

As mentioned above, the system also needs to deal with situations where the vehicle is driving on a side slope. With the first embodiment, which uses a measure of cross articulation to control the level of resistance to articulation, a side slope will not interfere with the detection of rough terrain. However if the vehicle is travelling on a side slope, opening the cross link valves 38, 40 and thereby reducing the roll stiffness of the vehicle will allow the vehicle body 22 to roll towards the downhill side of the vehicle. This can reduce the lateral stability of the vehicle. Therefore the control unit 32 is arranged to provide a measure of the side slope and, if that measure exceeds a certain threshold or limit, implying that the vehicle is on a side slope of at least a certain steepness or angle, to close one or both of the cross link valves 38, 40, irrespective of the levels of articulation movement being measured, thereby increasing the roll stiffness. The degree of side slope at which it is desirable to close permanently the cross link valves and increase the roll stiffness will depend on the particular vehicle, but in this particular embodiment corresponds to a lateral acceleration of 0.2 g.

The method of detection of a side slope is not critical to this invention, and will not be described in detail. However a preferred method is disclosed in our patent application WO 99/64262, the entire contents of which are incorporated herein by reference. Essentially that method entails measuring the lateral acceleration of the vehicle, calculating a maximum lateral acceleration which would be expected as a result of cornering, based on the vehicle speed and an estimate of the minimum turning circle diameter, and comparing the measured lateral acceleration with the expected cornering acceleration to provide a measure of the degree of side slope. Other methods of detecting and measuring side slope which could also be used use measurement of the wheel speeds of each of the vehicle wheels to give a measure of vehicle speed and yaw rate. These then allow a calculation of cornering acceleration, which can be compared with a measured lateral acceleration to determine the side slope. As a further modification to this method vehicle speed and steering angle can be used to determine the cornering acceleration.

The choice of which of the cross link valves 38, 40 should be closed will depend on the particular vehicle. Closing both together will clearly give maximum roll stiffness, but also increase significantly the resistance to articulation. It might therefore be beneficial to close one of the cross link valves 38, 40, but leave the other open for at least side slopes up to a certain predetermined angle, thereby giving a degree of roll control but still allowing a reasonable level of cross articulation, but to close both on extreme side slopes of greater than a higher angle.

In a second embodiment of the invention the cross linking valves 38, 40 can each be opened and closed independently of the other, on the basis solely of the level of articulation of the respective axle 18, 20. In this case the two articulation displacements $A_f$ and $A_r$ are measured as above and the modulus of each taken and low pass filtered. A running integral $Z_x$ for each is then taken of the same form as that of the cross articulation described above, i.e.

$$\mathrm{Articulation\_level} Z_x = \int_0^\infty (|\mathrm{Articulation}_{x,LPF} - X|) * k$$

where X is a speed dependent offset which increases with vehicle speed and k is a scaling factor, and x is either f for the front articulation or r for the rear articulation. The cross link valve 38, 40 for each axle is then controlled solely on the basis of the running articulation displacement measure $Z_x$ for that axle, being opened when it rises above a threshold value, and closed again when it falls below that value.

This method has the advantage that each axle can be controlled to suit the conditions in which it is operating. Also it gives the opportunity for the two axles to have different offsets or scaling factors which might be advantageous for example where the loading of the front and rear axles is very different, or where the front and rear suspensions are different.

The side slope strategy described in relation to the first embodiment can also be applied to this embodiment. However for side slopes where it is desired to have one valve open and the other closed, the system needs to be able to respond to the fact that either one of the valves may be open while the other is closed. For example it could be arranged to ensure simply that, on less extreme side slopes at least one of the valves is closed, on and more extreme side slopes both of them are closed.

Figure 2:
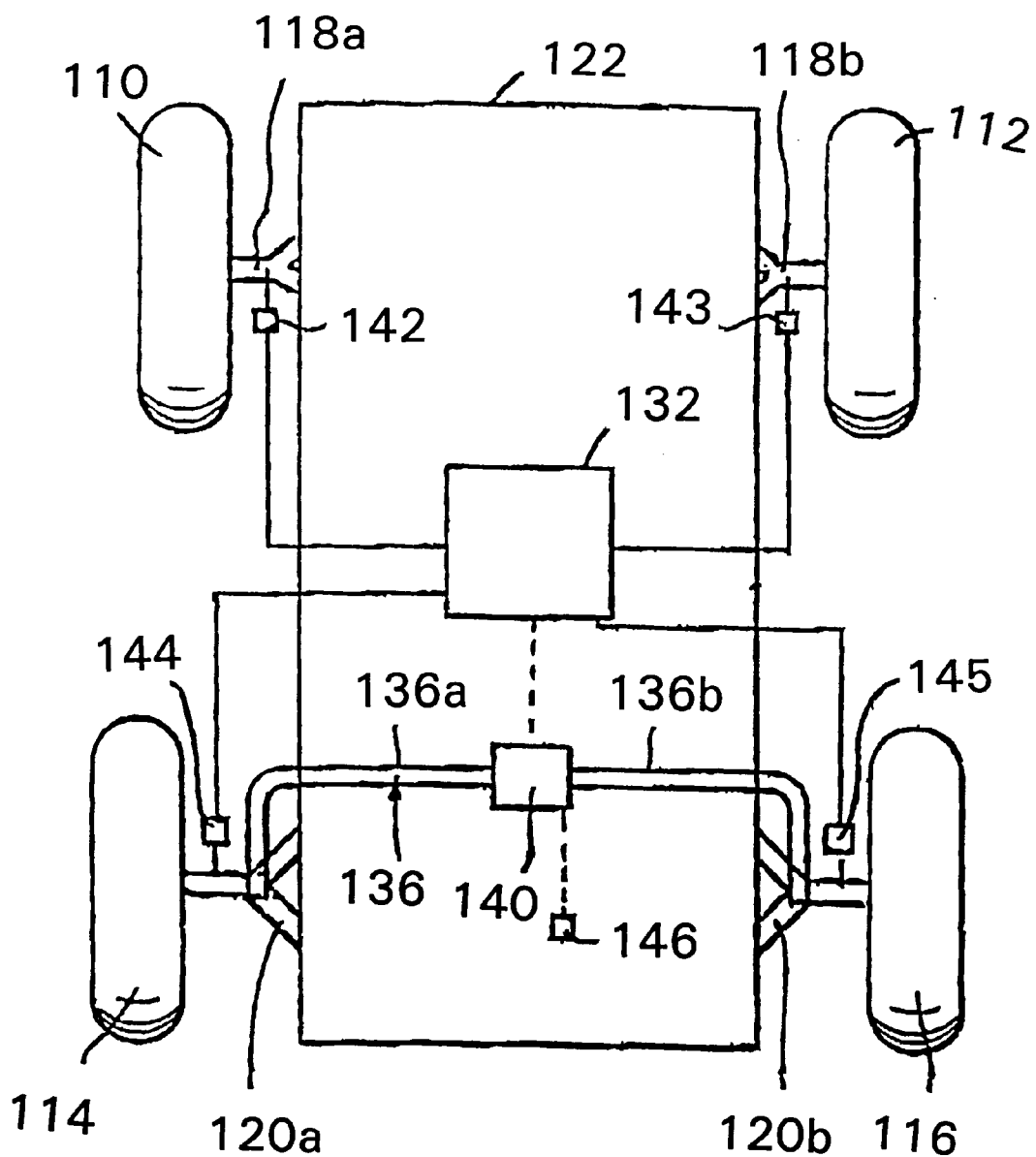
FIG. 2 is a diagrammatic representation of a vehicle including a suspension system according to another embodiment of the invention.

Referring to FIG. 2, in a further embodiment of the invention, a vehicle has an independent suspension including suspension arms 118a, 118b, 120a, 120b by means of which the front wheels 110, 112 and the rear wheels 114, 116 are connected to the vehicle body 122. A split anti-roll bar 136 is connected between the two rear wheels 114, 116. This anti-roll bar has two halves 136a, 136b with a decoupling device 140 between them, which may for example take the form of that shown in U.S. Pat. No. 4,796,911. This allows the two halves of the anti-roll bar to be locked together so that it acts as a conventional one-piece anti-roll bar resisting articulation of the rear wheels, or decoupled so that it does not significantly resist such articulation. A similar split anti-roll bar could also be connected between the front wheels 110, 112. An electronic control unit 132 controls the decoupling device 140 based on inputs from ride height sensors 142, 143, 144, 145 associated with the four wheels, and a vehicle speed sensor 146. The control unit operates in the same way as that of FIG. 1, keeping a running measure of the cross articulation of the front and rear wheels, or of the articulation of each axle independently, and then locking the two halves of the anti-roll bar (or bars) together when the articulation integral Z is below a threshold value, and de-coupling the two halves when it is above the threshold.

It will also be appreciated that there are other forms of suspension in which the resistance to single axle articulation or cross articulation can be varied, such as interconnected hydraulic systems, to which this invention is equally applicable.

We claim:

1. A vehicle suspension system for connecting at least one pair of wheels to opposite sides of a vehicle body, the system comprising a suspension associated with said at least one pair of wheels and arranged to allow articulation movement of said at least one pair of wheels relative to the body and to provide resistance to said articulation movement which resistance is adjustable between a high level and a low level, and a controller for adjusting said resistance wherein the controller can be shut down and started up and is arranged: to measure an instantaneous displacement of the wheels, on shut down to store the instantaneous displacement of the wheels and the instantaneous level of said resistance, and on start up, if the instantaneous level of said resistance on shut down was the low level, to compare the instantaneous displacement with the stored displacement and, if they are substantially the same, to return the resistance to the low level.

2. A system according to claim 1 wherein the controller is arranged, if said instantaneous displacement and said stored displacement are not substantially the same, to measure an instantaneous articulation displacement of the wheels and, if it is below a predetermined threshold to return the resistance to the low level.

3. A system according to claim 2 wherein the controller is arranged, if said instantaneous articulation is above said predetermined threshold, to delay returning of said resistance to said low level until the instantaneous articulation next falls to said predetermined threshold.

4. A vehicle suspension system for connecting at least one pair of wheels to opposite sides of a vehicle body, the system comprising:
   a suspension associated with the at least one pair of wheels and arranged to allow articulation movement of the at least one pair of wheels relative to the body and to provide adjustable resistance to the articulation movement;
   a plurality of sensors arranged to measure movement of the suspension and;
   a controller arranged to monitor said movement of the suspension and to determine therefrom a difference in ride height between the at least one pair of wheels thereby to determine a level of said articulation movement over a period, and to reduce the resistance if said level reaches a predetermined level, wherein
   the controller is arranged to measure the articulation of a first pair of the wheels and to measure the articulation of a second pair of the wheels and to measure the difference between the articulation of the first and second pairs of wheels thereby to measure a cross articulation movement, and to reduce the resistance if the cross articulation movement reaches a predetermined level.

5. A system according to claim 4, wherein the sensors are arranged to measure the ride heights of each of both pairs of wheels, and the controller is arranged to determined the level of cross articulation movement from the measured ride heights.

6. A system according to claim 4, wherein the controller is arranged to calculate a running measure of the level of articulation movement and to reduce the resistance if the running measure reaches a predetermined level.

7. A system according to claim 6, wherein the running measure is arranged to increase during periods when the level of articulation movement is high and to decrease during periods when the level of articulation movement is low.

8. A system according to claim 6, wherein the controller is arranged to increase the level of the resistance when the running measure falls below a predetermined level.

9. A system according to claim 6, wherein the controller is arranged to measure an instantaneous articulation displacement of the wheels, and running measure is a running average of the articulation displacement.

10. A system according to claim 4, wherein the controller includes a low pass filter and is arranged, when determining the level of the articulation movements, to filter out articulation movements of a frequency higher than a predetermined limit frequency.

11. A system according to claim 10, wherein the body has a natural frequency of vibration on the suspension and the limit frequency is of the order of the natural frequency of vibration.

12. A system according to claim 10, wherein the limit frequency is on the order of 2 to 3 Hz.

13. A system according to claim 4, wherein the controller is arranged to detect when the vehicle is traveling on a side slope, and, in response to detection of a side slope, to increase the resistance.

14. A system according to claim 4, wherein the resistance is adjustable between a high level and a low level, and the controller is arranged to detect when the vehicle is traveling on a side slope, and, if a side slope is detected when the resistance is at the low level, to adjust it to the high level.

15. A system according to claim 14 further comprising the plurality of sensors arranged to send signals to the controller and the controller is arranged to use the signals to detect when the vehicle is traveling on a side slope.

16. A system according to claim 4 further comprising a side slope detector arranged to detect when the vehicle is traveling on a side slope, and a controller operably connected to the suspension and the side slope detector and arranged to increase the resistance in response to detection of a side slope.

17. A system according to claim 16, wherein the resistance is adjustable between a high level and a low level, and the controller is arranged, in response to detection of a side slope when the resistance is at the low level, to adjust the resistance to the high level.

18. A system according to claim 4 further comprising the plurality of sensors, wherein the controller is arranged to receive signals from the sensors, to determine from the signals when the vehicle is traveling on a side slope, and to increase the resistance in response to detection of a side slope.

19. A system according to claim 18, wherein the resistance is adjustable between a high level and a low level, and the controller is arranged, in response to detection of a side slope when the resistance is at the low level, to adjust the resistance to the high level.

20. A system according to claim 4, wherein the suspension includes fluid filled suspension units associated with the wheels, an adjustable fluid interconnection is provided between the units and the controller is arranged to reduce the resistance by adjusting the interconnection.

21. A system according to claim 20, wherein the fluid is air.

22. A system according to claim 4, wherein the suspension includes a split anti-roll bar having two halves which can be de-coupled from each other to reduce the resistance.

23. A vehicle suspension system for connecting at least one pair of wheels to opposite sides of a vehicle body, the system comprising:

a suspension associated with the at least one pair of wheels and arranged to allow articulation movement of the at least one pair of wheels relative to the body and to provide adjustable resistance to the articulation movement;

a plurality of sensors arranged to measure movement of the suspension and;

a controller arranged to monitor the movement and to determine therefrom the level of the articulation movement and to reduce the resistance if the articulation movement reaches a predetermined level wherein the control means is arranged to measure a difference in ride height between the at least one pair of wheels and to determine the level of articulation movement of the at least one pair of wheels from the measured difference in ride heights;

the controller is arranged to calculate a running measure of the level of articulation movement and to reduce the resistance if the running measure reaches a predetermined level and the running measure is arranged to increase during periods when the level of articulation movement is high and to decrease during periods when the level of articulation movement is low; and wherein a vehicle speed sensor is arranged to measure a traveling speed of the vehicle and the running measure includes a speed dependent offset arranged to cause it to reduce when the traveling speed of the vehicle is high.

24. A vehicle suspension system for connecting at least one pair of wheels to opposite sides of a vehicle body, the system comprising:

a suspension associated with the at least one pair of wheels and arranged to allow articulation movement of the at least one pair of wheels relative to the body and to provide adjustable resistance to the articulation movement;

a plurality of sensors arranged to measure movement of the suspension; and a controller arranged to monitor the movement and to determine therefrom the level of the articulation movement and to reduce the resistance if the articulation movement reaches a predetermined level wherein the articulation sensors are arranged to measure the instantaneous articulation displacement of the wheels and to reduce the resistance only when the displacement is less than a predetermined limit.

25. A vehicle suspension system for connecting at least one pair of wheels to opposite sides of a vehicle body, the system comprising:

a suspension associated with the at least one pair of wheels and arranged to allow articulation movement of the at least one pair of wheels relative to the body and to provide adjustable resistance to the articulation movement;

a plurality of sensors arranged to measure movement of the suspension; and a controller arranged to monitor the movement and to determine therefrom the level of the articulation movement and to reduce the resistance if the articulation movement reaches a predetermined level, wherein the resistance is adjustable between a high level and a low level and the controller can be shut down and started up and is arranged: to measure an instantaneous articulation displacement of the wheels, on shut down to store the instantaneous articulation displacement of the wheels and the instantaneous level of the resistance, and on start up, if the instantaneous level of the resistance on shut down was the low level, to compare the instantaneous displacement with the stored displacement and, if they are substantially the same, to return the resistance to the low level.

* * * * *